Patented June 9, 1953

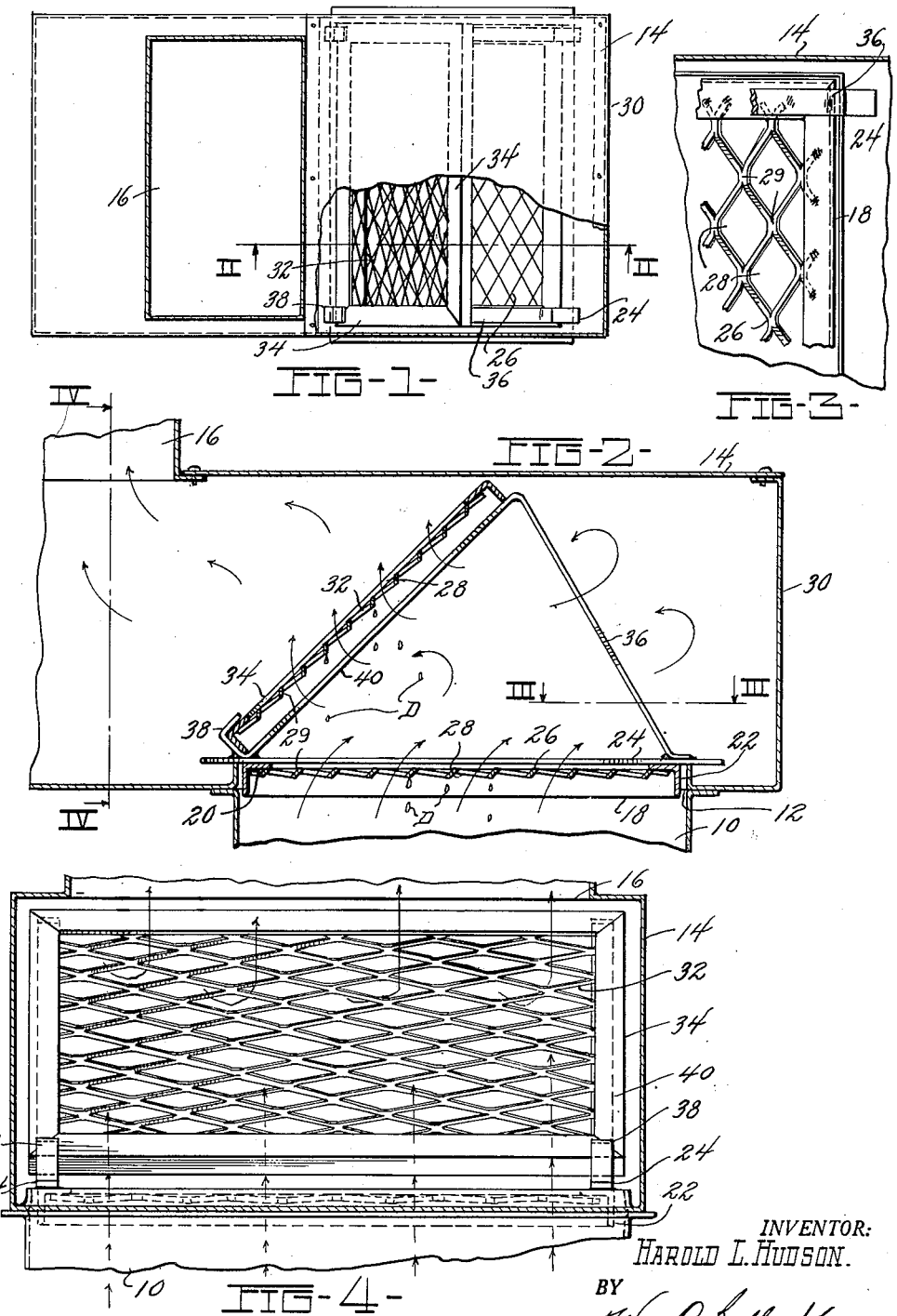
June 9, 1953  H. L. HUDSON  2,641,331
FLUE FOR DEEP-FRYING EQUIPMENT
Filed March 20, 1950
INVENTOR:
HAROLD L. HUDSON
BY
Wm. O. Ballard
ATTY.

2,641,331

UNITED STATES PATENT OFFICE 2,641,331

FLUE FOR DEEP-FRYING EQUIPMENT

Harold L. Hudson, Toledo, Ohio

Application March 20, 1950, Serial No. 150,743

1 Claim. (Cl. 183—51)

This invention relates to flues for waste gases and vapors, and more particularly to baffle units which may be placed within such flues. Ordinarily, flues are used to conduct waste gases and vapors from cooking, baking and frying equipment within a building, the waste being carried by the flue to the exterior of the building, thence exhausted to the open air. Many types of cooking, frying, etc., entail the use of considerable quantities of oils, fats, and other condensable products, and these substances, when in vapor form, due to cooking temperatures involved, may be carried away by the air and steam normally present in the flue and discharged into the air as waste.

It is an object of this invention to provide a baffle unit which may be placed in the path of the flow of the waste gases from a cooking or frying operation which will cause the condensation of a major part of the vapors carried by the flue.

Another object of this invention is to provide a reticulated baffle unit which will partially intercept the normal flow of gases and vapors in a flue and thereby create a turbulence within the mass of moving vapors in the flue, as an aid in the condensation of the vapors in the flue.

Another object of this invention is to provide a baffle unit which will present a primary condensing surface in one plane, a secondary vapor condensing surface placed in another plane, both condensing surfaces acting to stratify the flow of vapors passing therethrough to cause impingement of a major portion of the vapors on the condensing surfaces.

And another object of this invention is to provide a baffle unit which will condense at least a part of the vapors of cooking and collect the condensed vapors from such cooking, and permit dropping of the condensate back into the cooking zone or point of origin of the vapors for reclamation and further use.

Other objects and advantages of this invention relating to the arrangement, operation and function of the related elements of the structure, to various details of construction, to combinations of parts and to economies of manufacture, will be apparent to those skilled in the art upon consideration of the following description and appended claim, reference being had to the accompanying drawings forming a part of this specification wherein like reference characters designate corresponding parts in the several views.

Referring to the drawings:

Fig. 1 is a plan view of a cooking unit hood and flue, parts being broken away to disclose a baffle construction embodying the invention herein;

Fig. 2 is a view on the line II—II, Fig. 1;

Fig. 3 is a view on the line III—III, Fig. 2; and

Fig. 4 is a view on the line IV—IV, Fig. 2.

In the production of potato chips and like food products, the articles are deep fried, that is, submerged for a period of time in a body of hot cooking oils which has a temperature well above the boiling point of water. Therefore, there is a constant flow of vapor from the kettles carrying away a considerable proportion of the cooking fats. This is not only a costly loss but the fumes escaping from the terminal outlet of the flue system condense on nearby structures giving the same an undesirable coating of grease.

The invention herein reduces the terminal loss of fat to such an extent, that the undesirable exterior coatings are practically eliminated with the inherent savings of reclaimed cooking media.

From the kettle region 10, the combined water and fatty vapors are normally directed through aperture 12 into hood 14, flowing in circuitous path therein to outlet 16 into a suitable stack.

The device herein is preferably placed to be disposed over the aperture 12 and comprises a rectangular frame 18 fabricated from angle iron forming an upper inwardly directed peripheral flange 20 with a depending skirt 22 thereabout.

A pair of slats 24 are welded to the upper face of the frame, one at each end thereof, providing overhangs to engage the structure on opposite sides of the aperture 12, thereby providing a supporting mount to suspend the frame for nesting within the aperture.

The frame 18 carries a screen 26 preferably attached to the under side of the flange 20 and extending across the frame 18 to bridge the aperture. This screen is of the expanded metal type and a desirable size comprises one fabricated from stock approximately $\frac{3}{32}$" thick and slit to provide $\frac{1}{8}$" ribs and expanded to provide diamond shaped openings 28 in the neighborhood of $\frac{3}{4}$" by $1\frac{5}{8}$". This provides canted baffles or ribs having vanes or baffle connections 29 of about $\frac{1}{4}$" width. In placing the screen 26 over the aperture 12, it is desired to have the cant upwardly toward the closed end 30 of the hood 14 or directed away from the stack inlet 16.

The vapors and fumes passing through the aperture 12 are thus stratified and directed toward the hood end 30 from where they have a reverse flow to the stack.

This reverse or return flow is through a second screen 32 similar to the screen 26. This screen 32 is mounted in a rectangular frame 34 also of angle iron and canted about 45° upwardly toward the hood end 30. The contour of the frame 34 is designed to the cross-sectional shape of the hood.

Inverted V-shaped brackets are provided to mount this frame 34 and comprise strips 36 attached to the upper faces of the slats 24 and provide seats 38 and supports 40.

The screen 32 is placed to have the baffles present a maximum surface to the flow of the vapors which is against the axis of the plane of the screen extent. This is also true of the screen 26.

As the mixed fatty and water vapors flow from the aperture 12 through reticulated baffle 26, the stream is broken, chilled, and directed toward the hood rear 30. A certain portion of the fats condense thereon and drip back into the cooking units. The flow is reversed and travels through the mesh or lattice-work 32 where it is further chilled with a consequent additional condensation of the fats which collect thereon into droplets D in turn falling back into the cooking units.

This combination of reverse flow and multiple screenings allows only a very small portion of the fats to reach the atmosphere by way of the stack, while the flow interruption is insufficient to create any objectionable back pressure or condense any major portion of the water vapors.

The units are easily replaced, if necessary, yet in action, they have proven to be self-cleaning within the ranges of temperatures normally used in food frying.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation.

What is claimed and is desired to secure by United States Letters Patent:

In a ventilating flue for deep frying equipment wherein said flue has an inlet for receiving the cooking vapors from the frying equipment, a substantially horizontal duct therefrom provided with an outlet remote from the inlet, a unit for filtering and condensing portions of said vapors flowing through said duct comprising a frame having an L-shaped cross-section, one side of which provides a collar extending into said inlet from the horizontal duct, the other side providing a seat in said horizontal duct about said inlet, a pair of opposing strap elements angularly extending upwardly from opposite portions of said seat, a first expanded metal sheet in said seat forming a cover for said inlet, said sheet including vanes directed to cause the flow of vapors therefrom in a direction away from said outlet, an auxiliary frame seated on said straps in an angular position above said first expanded metal sheet, and a second expanded metal sheet carried by said auxiliary frame, said second expanded metal sheet including vanes directed substantially vertically above said first expanded sheet.

HAROLD L. HUDSON.

References Cited in the file of this patent

UNITED STATES PATENTS

| Number | Name | Date |
|---|---|---|
| 468,345 | Hussey et al. | Feb. 9, 1892 |
| 1,290,423 | Valentine | Jan. 7, 1919 |
| 1,535,819 | Emmet | Apr. 28, 1925 |
| 1,620,266 | McCarthy | Mar. 8, 1927 |
| 1,895,642 | Preble | Jan. 31, 1933 |
| 1,926,433 | Cartmell | Sept. 12, 1933 |
| 2,493,726 | O'Day | Jan. 3, 1950 |
| 2,494,146 | Spanos | Jan. 10, 1950 |
| 2,532,420 | Pledger | Dec. 5, 1950 |